United States Patent [19]
Renken et al.

[11] Patent Number: 5,172,559
[45] Date of Patent: Dec. 22, 1992

[54] COMPARTMENTALIZED TRANSPORT REFRIGERATION SYSTEM HAVING MEANS FOR ENHANCING THE CAPACITY OF A HEATING CYCLE

[75] Inventors: David J. Renken, Minneapolis; John P. Saunders, Brooklyn Park, both of Minn.

[73] Assignee: Thermo King Corporation, Minneapolis, Minn.

[21] Appl. No.: 785,838

[22] Filed: Oct. 31, 1991

[51] Int. Cl.⁵ .............................................. F25B 13/00
[52] U.S. Cl. .................................... 62/81; 62/117; 62/158; 62/160; 62/200; 62/324.6
[58] Field of Search ................. 62/81, 117, 158, 160, 62/174, 200, 278, 324.6, 509

[56] References Cited

U.S. PATENT DOCUMENTS

| | | | |
|---|---|---|---|
| 3,537,274 | 11/1970 | Tilney | 62/160 X |
| 4,122,686 | 10/1978 | Lindahl et al. | 62/81 |
| 4,685,306 | 8/1987 | Howland et al. | 62/117 |
| 4,706,468 | 11/1987 | Howland et al. | 62/199 |
| 4,711,095 | 12/1987 | Howland et al. | 62/117 |
| 4,712,383 | 12/1987 | Howland et al. | 62/200 |
| 4,748,818 | 6/1988 | Satterness et al. | 62/160 |
| 4,862,705 | 9/1989 | Nakamura et al. | 62/324.6 X |
| 4,896,512 | 1/1990 | Howland | 62/117 |
| 4,912,933 | 4/1990 | Renken | 62/81 |
| 4,932,219 | 6/1990 | Howland et al. | 62/174 |
| 5,107,686 | 4/1992 | Howland | 62/160 |

*Primary Examiner*—Stephen M. Hepperle
*Attorney, Agent, or Firm*—D. R. Lackey

[57] ABSTRACT

A compartmentalized transport refrigeration system which holds selected set point temperatures in at least first and second served spaces via heating and cooling cycles. The system includes a refrigerant circuit having high and low pressure sides, including a compressor, a condenser, a receiver, at least first and second evaporator sections respectively associated with the first and second served spaces, an accumulator, and a mode selector valve having heating and cooling positions. Control provides a heat signal when the need for a heating cycle in one of the served spaces is detected. The receiver is connected to the low pressure side of the refrigerant circuit for a predetermined period of time in response to the heat signal. At the end of the period of time the mode selector valve is operated from the cooling position to the heating position, and the connection between the receiver and low pressure side is terminated.

7 Claims, 2 Drawing Sheets

COMPARTMENTALIZED TRANSPORT REFRIGERATION SYSTEM HAVING MEANS FOR ENHANCING THE CAPACITY OF A HEATING CYCLE

TECHNICAL FIELD

The invention relates in general to compartmentalized transport refrigeration systems, and more specifically to such systems having heating and cooling cycles which utilize hot compressor discharge gas.

BACKGROUND ART

Transport refrigeration systems for conditioning the loads of trucks and trailers have cooling, null and heating modes. The heating mode includes a heating cycle for controlling load temperature to a selected set point, as well as a heating cycle for defrosting the evaporator coil. When the system switches from a cooling or null mode into a heating cycle, hot compressor discharge gas is diverted by suitable mode selecting valve means from the normal refrigerant circuit, which includes a condenser, receiver, expansion valve, evaporator, and accumulator, to a heating cycle circuit which includes a the compressor, the evaporator, and the accumulator.

To make more liquid refrigerant available during a heating cycle, a prior art procedure pressurizes the receiver with hot compressor discharge gas to force liquid refrigerant out of the receiver and into the refrigerant cooling circuit. This requires an auxiliary hot gas line which runs from the main hot gas line to the receiver, along with a by-pass check valve, a by-pass service valve, a receiver tank pressure solenoid, and a condenser check valve. A bleed port in the expansion valve allows the liquid refrigerant forced out of the receiver to flow into the evaporator during the heating cycle, to improve heating and defrosting capacity.

U.S. Pat. No. 4,748,818, which is assigned to the same assignee as the present application, improved upon the aforesaid prior art procedure by connecting the output of the receiver to the accumulator during a heating cycle. This eliminated the auxiliary hot gas pressure line to the receiver, and the hereinbefore mentioned associated control items. While this arrangement allowed some refrigerant to flow from the condenser to the receiver, some refrigerant was still being trapped in the condenser, especially at low ambient temperatures.

U.S. Pat. No. 4,912,933, which is assigned to the same assignee as the present application, improved upon the arrangement of the '818 patent by connecting the receiver to the accumulator when the need for a heating cycle is detected, with the connection being made before the mode selecting valve means actually switches to the heating circuit. In other words, the need for a heating cycle establishes direct refrigerant flow communication between the receiver and accumulator while delaying the switch of the hot gas refrigerant flow from the cooling circuit, which includes the condenser and receiver, to the heating circuit. This forces a substantial amount of the refrigerant trapped in the condenser and receiver to flow to the lower pressure accumulator, providing a significant enhancement to the heating and defrost cycles. In both the '818 and '933 patents, the direct fluid flow communication between the receiver and accumulator is preferably maintained during the heating cycle, with a check valve preventing reverse flow into the receiver.

U.S. Pat. Nos. 4,685,306; 4,706,468; 4,711,095; 4,712,383; 4,896,512; and 4,932,219, which are assigned to the same assignee as the present application, are all directed to compartmentalized or multi-temperature transport refrigeration systems which have at least first and second served spaces or compartments which are individually conditioned to selected set point temperatures. These patents mention the problem of obtaining sufficient heating capacity at low ambient temperatures in a compartmentalized transport refrigeration system. It is common when such systems are to be utilized in extremely cold ambient temperatures to employ an induction generator to power electrical heating resistors, instead of, or to augment, hot refrigerant gas heating. The system of the '933 patent has not been utilized in a compartmentalized transport refrigeration unit because while one compartment is in a heating cycle, another may be in a cooling cycle, and it was not thought that the condenser flushing of the '933 patent could be economically employed.

It would be desirable, and it is an object of the present invention, to be able to sufficiently enhance the hot refrigerant gas heating capability of compartmentalized transport refrigeration systems to the point where the need for auxiliary heating, such as provided by ah induction generator, may be eliminated, or at least significantly reduced.

SUMMARY OF THE INVENTION

Briefly, the present invention is a compartmentalized transport refrigeration system which holds selected set point temperatures in at least first and second served spaces via heating, cooling and null cycles. The system includes a refrigerant circuit having high and low pressure sides, including a compressor, a condenser, a receiver, at least first and second evaporator sections respectively associated with the first and second served spaces, an accumulator, and mode selector valve means having heating and cooling positions. Control means provides a heat signal when the need for a heating cycle in one of the served spaces is detected, with the mode selector valve means being in the cooling position in the absence of a heat signal.

First means responsive to the heat signal connects the receiver to the low pressure side of the refrigeration system, such as by connecting the receiver and accumulator in direct fluid flow communication, with the first means including a controllable valve which is operated from a closed position to an open position in response to the heat signal.

Second means responsive to the heat signal operates the mode selector valve means from the cooling position to the heating position thereof, a predetermined period of time after initiation of the heat signal. The first means includes means responsive to the termination of the predetermined period of time for returning the controllable valve of the first means to the closed position thereof.

Thus, a condenser flushing mode occurs prior to a heating cycle relative to a served space, which forces liquid refrigerant in the condenser to flow to the low pressure side of the refrigeration system via the receiver, to increase the quantity of refrigerant available during the heating cycle. Terminating the direct fluid flow communication between the receiver and the low pressure side of the refrigeration system, when the mode selector valve means is operated to the heating position thereof, prevents high pressure refrigerant, required by a cooling cycle associated with another of the served spaces, from being short circuited to the low pressure side of the system.

A new method of operating a compartmentalized transport refrigeration system includes the steps of providing a heat signal when the need for a heat cycle is detected in one of the served spaces, connecting the receiver to the low pressure side of the refrigeration system when the heat signal is provided, initiating a predetermined timing period in response to the heat signal, maintaining the mode selector valve means in a cooling cycle position during the timing period, operating the mode selector valve means to select the heating cycle position at the expiration of the timing period, and terminating the direct fluid communication between the receiver and the low pressure side of the refrigeration system upon the expiration of the timing period.

Continuing the mode selector valve means in the cooling position thereof while the receiver is directly connected to the low pressure side of the refrigerant circuit forces liquid refrigerant in the condenser to flow to the low pressure side of the system via the receiver, to increase the quantity of refrigerant available during the ensuing heating cycle. Terminating the direct fluid flow communication between the receiver and low pressure side of the refrigerant circuit, at the time the mode selector valve means is switched to the heating position, prevents high pressure refrigerant, required by a cooling cycle associated with another of the served spaces, from being short circuited to the low pressure side of the refrigeration system.

Thus, the advantages of the '933 patent have been employed in a compartmentalized transport refrigeration system, while economically overcoming problems in utilizing the teachings of the '933 patent in a compartmentalized transport refrigeration system.

BRIEF DESCRIPTION OF THE DRAWINGS

The invention will become more apparent by reading the following detailed description in conjunction with the drawings, which are shown by way of example only, wherein.

DESCRIPTION OF PREFERRED EMBODIMENTS

The present invention may modify the piping diagrams and electrical control systems shown in any of the hereinbefore mentioned U.S. Patents which are directed to compartmentalized transport refrigeration systems. When utilizing the piping diagrams and electrical control of these patents, one of the two evaporator units would be designated as the "low temperature" evaporator, and it would be capable of conditioning a frozen load in the associated cargo space. The remaining evaporator unit would be designated the "high temperature" evaporator, and it would be capable of conditioning a fresh load in the associated cargo space.

The refrigeration piping arrangement and electrical control disclosed in application Ser. No. 07/646,926, filed Jan. 28, 1991, now U.S. Pat. No. 5,107,686, entitled "Compartmentalized Transport Refrigeration System", which is assigned to the same assignee as the present application, discloses a compartmentalized refrigeration system in which either of the two evaporator units may condition a fresh or a frozen load in their associated cargo spaces, as desired. For purposes of example, the piping diagram of application Ser. No. 07/646,926 will be modified according to the teachings of the invention, and accordingly the aforesaid patent application is hereby incorporated into the specification of the present application by reference. Also, while the invention will be described relative to a compartmentalized transport refrigeration system having first and second compartments, the concepts of the invention apply equally to a compartmentalized transport refrigeration system having more than two conditioned compartments.

Figure 1:
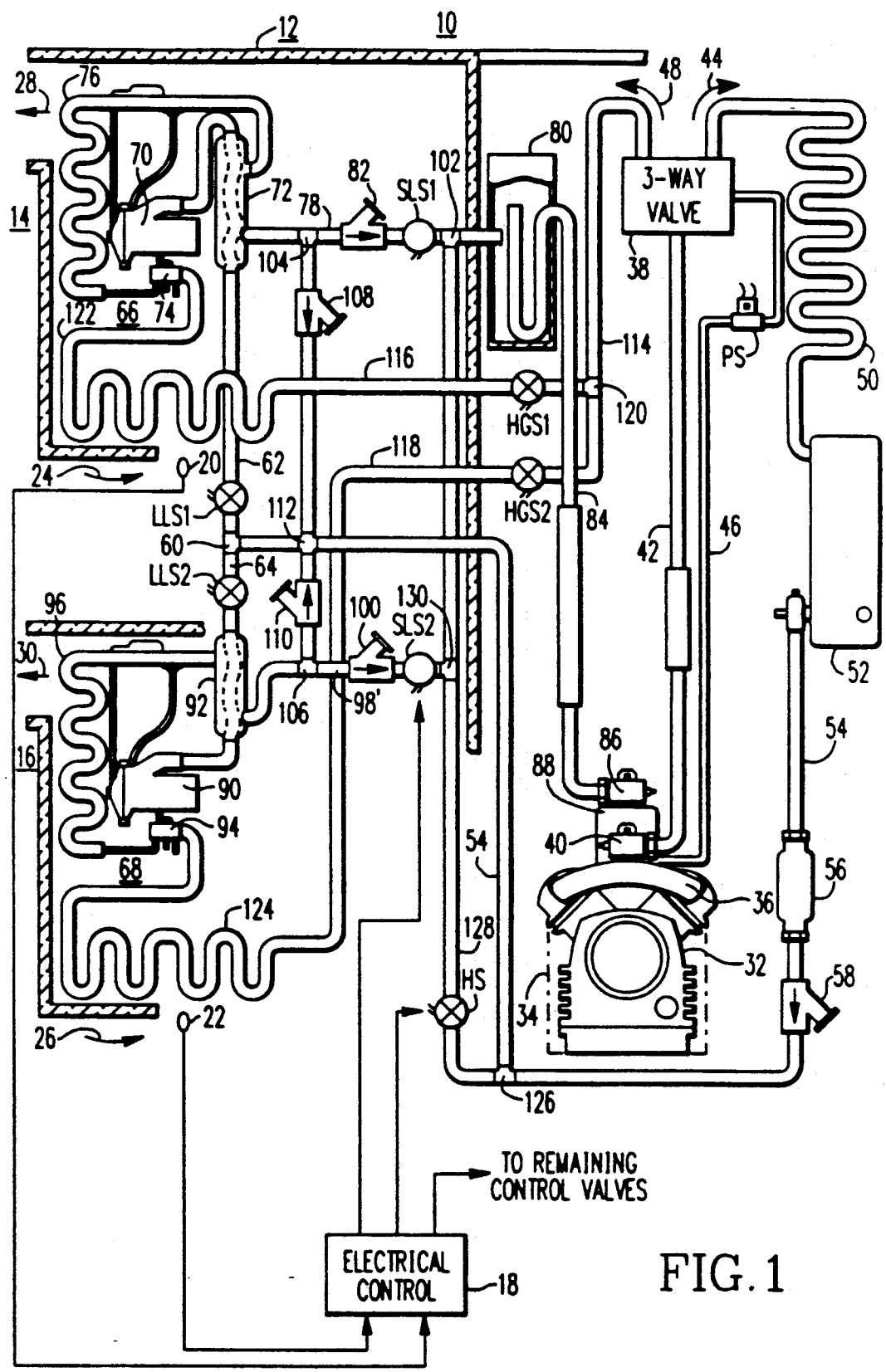
FIG. 1 is a schematic and piping diagram of a compartmentalized transport refrigeration system constructed according to the teachings of the invention.

Referring now to the drawings, and to FIG. 1 in particular, there is shown a compartmentalized, multi-temperature transport refrigeration system 10 constructed according to the teachings of the invention. Transport refrigeration system 10 is associated with a truck or trailer 12 having first and second compartments or served spaces 14 and 16, respectively, to be conditioned. Compartments 14 and 16 may be located serially from the front to the back of the associated truck or trailer 12, or side-by-side, each extending from the front to the back of the associated truck or trailer 12, as desired.

System 10 is controlled by a temperature controller 18. Since temperature controller 18 is described in detail in the incorporated application, only modifications thereof required by the present invention will be disclosed and described herein. Temperature controller 18 includes first and second temperature sensors 20 and 22 respectively disposed in the first and second compartments 14 and 16, such as by being located to sense the temperature of air returning to system 10 from the compartments 14 and 16. The return air is indicated by arrows 24 and 26. In some instances, the temperature of the conditioned air being discharged by system 10 into the first and second compartments 14 and 16 may be sensed, with additional sensors (not shown) being disposed to sense the temperature of the discharge air. The discharge air is indicated by arrows 28 and 30.

Transport refrigeration system 10 includes a plurality of closed refrigerant circuits, which include a refrigerant compressor 32 driven by a prime mover, with the desired refrigerant circuit or circuits required at any time being selectable by controllable valves. Controllable valves are indicated in FIG. 1 in either a normally open or a normally closed position, but it will be understood that the opposite positions may be used by modifying electrical control accordingly. The prime mover, which is indicated generally by broken outline 34, may be an internal combustion engine, an electric motor, or a combination which includes an internal combustion engine for over-the-road use, and a stand-by electrical motor for use when the truck or trailer is parked near a source of electrical potential.

Discharge ports 36 of compressor 32 are connected to a refrigeration circuit selecting valve means 38 via a discharge service valve 40 and a hot gas line 42. Valve means 38, which is a mode selecting valve having cooling and heating positions, may be a three-way valve, as illustrated, or two separate valves may be used, as desired. For the purposes of this description, valve means 38 will be referred to as a three-way valve.

Three-way valve 38 is controlled by a normally closed pilot solenoid valve PS. When pilot solenoid valve PS is de-energized, three-way valve 38 is biased to a first position, which will be called the "cooling" position. The first position directs hot, high pressure refrigerant gas from compressor 32 into a first refrigerant circuit 44. When pilot solenoid valve PS is energized, pilot solenoid PS is actuated to an open position which allows compressor pressure, via conduit 46, to operate three-way valve 38 to a second position, which will be called the "heating" position. The heating position directs the hot, high pressure refrigerant gas from compressor 32 into a second refrigerant circuit 48.

The first refrigerant circuit 44 includes a condenser coil 50, a receiver 52, and a main liquid line 54. The main liquid line 54 includes a refrigerant drier 56, a check valve 58, and a tee 60. The main liquid line 54 then divides into first and second sections 62 and 64 which respectively extend to first and second evaporator units 66 and 68. The first liquid line section 62 extends to a first expansion valve 70 in the first evaporator unit 66 via a normally closed liquid line solenoid valve LLS1 and a first path through a heat exchanger 72. The first refrigerant circuit 44 then continues from expansion valve 70 to a refrigerant distributor 74 which distributes refrigerant to various sections of an evaporator coil 76. Refrigerant from evaporator coil 76 passes through a second path through heat exchanger 72 and then into a suction line 78. Suction line 78 interconnects the output of heat exchanger 72 to the inlet side of an accumulator 80 via a check valve 82 and a normally open suction line solenoid valve SLS1. A suction line 84 interconnects the outlet side of accumulator 80 to the suction port of compressor 32 via a suction line service valve 86 and a suction line throttling valve 88.

The second liquid line section 64 extends to a second expansion valve 90 in the second evaporator unit 68 via a normally closed liquid line solenoid valve LLS2 and a first path through a heat exchanger 92. The first refrigerant circuit 44 then continues from expansion valve 90 to a refrigerant distributor 94 which distributes refrigerant to various sections of an evaporator coil 96. Refrigerant from evaporator coil 96 passes through a second path through heat exchanger 92 and then into a suction line 98. Suction line 98 interconnects the output of heat exchanger 92 to the inlet side of the accumulator 80 via a check valve 100 and a normally open suction line solenoid valve SLS2. As indicated, suction line 98 may join suction line 78 at a tee 102 before entering accumulator 80. Also, suction lines 78 and 98 have tees 104 and 106 located immediately adjacent to the outlets of heat exchangers 72 and 92 which respectively connect the associated suction line to liquid line 54, via check valves 108 and 110, respectively. As illustrated, suction lines 78 and 98 join liquid line 54 adjacent to tee 60 in a four-way connector 112.

The first refrigerant circuit 44 can function as a cooling circuit for either the first evaporator unit 66 or the second evaporator unit 68, removing heat from the first or second compartment 14 or 16, and rejecting heat to ambient via condenser coil 50.

When either the first or second evaporator unit 66 or 68 requires heat for defrosting, or for holding a selected set point temperature, as detected by sensors 20 and 22, controller 18 provides a heat signal HSIG which energizes and opens the normally closed pilot solenoid valve PS. Compressor pressure now operates three-way valve 38, and three-way valve 38 shifts its output, directing hot compressor gas to the second refrigeration circuit 48. The second refrigerant circuit 48 includes a hot gas line 114 which divides into first and second hot gas line sections 116 and 118 at a tee 120. The first hot gas line section 116 extends to distributor 74 via a normally closed hot gas solenoid HGS1 and a defrost pan heater 122. The second refrigerant circuit 48 then continues back to compressor 32 via evaporator coil 76, heat exchanger 72, suction line 78, accumulator 80 and suction line 84. The second hot gas line section 118 extends to distributor 94 via a normally closed hot gas solenoid HGS2 and a defrost pan heater 124. The second refrigerant circuit then continues back to compressor 32 via evaporator coil 96, heat exchanger 92, suction line 98, accumulator 80 and suction line 84.

The construction of compartmentalized system 10 to this point has eliminated the need for pressurization of receiver 52, which thus eliminates a hot gas line extension from hot gas line 114 to the receiver 52, as well as eliminating the associated by-pass check valve, by-pass service valve, receiver tank pressure solenoid, and condenser check valve. A receiver check valve 58 has been inserted into liquid line 54 to prevent flow back into the outlet side of receiver 52. Liquid line 54 is additionally connected to the low pressure side of refrigeration system 10. The low pressure side of the first refrigerant circuit 44 starts at expansion valves 70 and 90, and it includes the refrigerant distributors 74 and 94, evaporator coils 76 and 96, the outer shells or second paths through heat exchangers 72 and 92, suction lines 78 and 98, accumulator 80, and suction line 84. The low pressure side of the second refrigerant circuit 48, which exists while three-way valve 38 is in the cooling position, includes hot gas line 114, hot gas line sections 116 and 118, defrost pan heaters 122 and 124, and the previously mentioned items from the first refrigerant circuit 44.

In a preferred embodiment of the invention, liquid line 54, starting at a tee 126 located downstream from drier 56 and check valve 58, branches via an auxiliary liquid line 128 and a normally closed controllable solenoid valve HS, directly to the inlet side of accumulator 80. Since suction line sections 78 and 98 are connected to the inlet of accumulator 80, auxiliary liquid line 128 may be connected to one of them, such as to suction line 98 via a tee 130, as illustrated. Also, as disclosed in application Ser. No. 07/658,735, filed Feb. 21, 1991, entitled "Transport Refrigeration System Having Means For Enhancing The Capacity Of A Heating Cycle", auxiliary liquid line 128 may be connected to the low pressure side of system, 10 at an earlier point to provide more storage volume for the liquid refrigerant which is forced out of the condenser 50 and receiver 52. For example, auxiliary liquid line 128 may be connected to hot gas line 114. If auxiliary liquid line 128 is connected to hot gas line 114, the hot gas solenoid HGS1 or HGS2 which is associated with the evaporator section which requires heat will have to be opened at the same time that heat solenoid HS is opened. This is not a problem, as when an evaporator section 66 or 68 requires a heat cycle, its associated hot gas solenoid HGS1 or HGS2 will be opened at some point in time before the heat cycle can be initiated. The only difference being that in the present invention, the appropriate hot gas solenoid and heat solenoid HS will be opened before the three-way valve 38 is switched to the heating position.

More specifically, when one of the evaporator sections 66 or 68 requires a heat cycle for defrosting, or for holding a selected temperature set point for compartments 14 or 16, instead of immediately energizing pilot solenoid PS to switch three-way valve 38 to the heat position, a heat signal HSIG is provided by controller 18 which opens heat solenoid HS. If auxiliary liquid line 128 is connected to hot gas line 114 instead of directly to the inlet of accumulator 80, controller 18 would also provide a signal which opens the appropriate hot gas solenoid HGS1 or HGS2.

Figure 2:
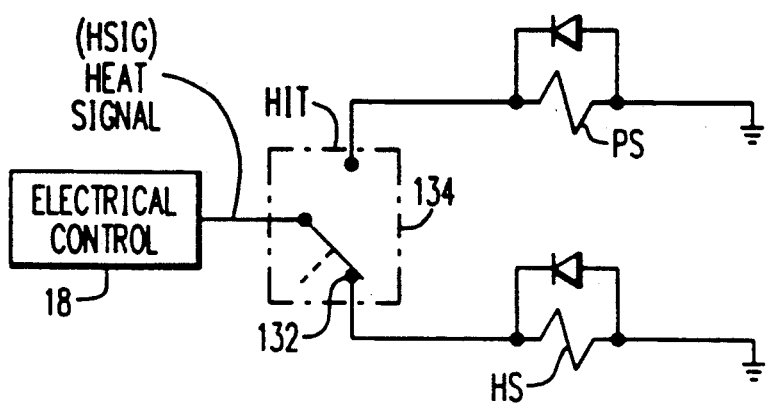
FIG. 2 is an electrical schematic diagram illustrating how certain controllable elements in FIG. 1 may be connected to the refrigeration control.
Figure 3:
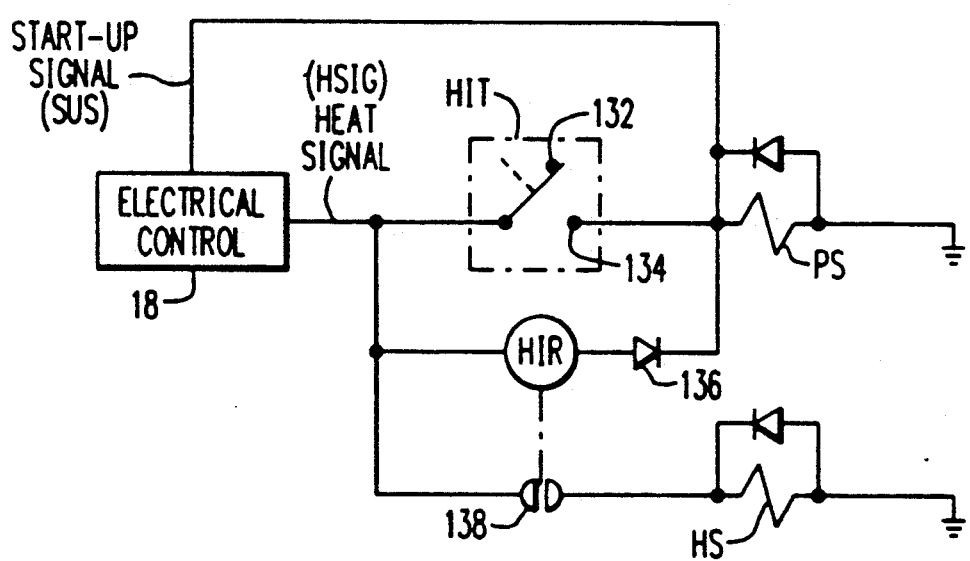
FIG. 3 is an electrical schematic diagram similar to FIG. 2, except setting forth a preferred implementation of the connections of the controllable elements shown in FIG. 2 to the refrigeration control.

A heat initiation timer HIT, shown in FIGS. 2 and 3, is also started by heat signal HSIG. At the end of a preset timing period provided by timer HIT, such as about two minutes, for example, pilot solenoid PS is energized and thus opened, the appropriate hot gas solenoid HGS1 or HGS2 is also energized and thus opened, if not energized at the same time as heat solenoid HS. Then, unlike the teachings of the prior art, simultaneously with the energization of pilot solenoid PS, the heat solenoid HS is closed. The reason for this will become apparent when the operation of system 10 is hereinafter described.

With one or both of the evaporator sections 66 and 68 in a cooling cycle, a request by one of the evaporator sections 66 or 68 for a heating cycle will thus open heat solenoid HS while three-way valve 38 continues to direct hot, high pressure refrigerant vapor into condenser 50. With liquid line 54 now directly connected to the low pressure side of system 10 via the open heat solenoid HS, condensed liquid refrigerant in condenser 50 will be forced into receiver 52, and liquid refrigerant in receiver 52 will be forced to flow to the low pressure side, ie., directly to accumulator 80 in the embodiment illustrated in FIG. 1, or to some other suitable point of the low pressure side. Then, at the end of the time delay provided by timer HIT, three-way valve 38 shifts from the cooling position to the heating position thereof, to initiate the heating cycle. The heating cycle will be enhanced by the availability of the additional liquid refrigerant which would normally be trapped in the condenser and receiver.

As illustrated in FIG. 2, the heat initiation timer HIT has normally closed contacts 132 connected such that the heat signal HSIG, when provided by controller 18, will immediately energize and open heat solenoid HS. Heat initiation timer HIT additionally has normally open contacts 134 connected such than when timer HIT times out and closes contacts 134, pilot solenoid PS will be energized and opened, to initiate the heat cycle by switching three-way valve 38 from the cool position to the heat position. When timer HIT times out and closes contacts 134, it simultaneously opens contacts 132 to provide the required de-energization and closing of heat solenoid HS. The heat signal HSIG persists until the end of the defrost cycle, if initiated by a demand for evaporator coil defrost, and it persists until the evaporator section requiring a heat cycle to hold set point no longer requires heat. Thus, heat initiation timer HIT will remain in the actuated or timed-out position with contacts 134 closed and contacts 132 open, until the heat signal HSIG is removed, at which time timer HIT will reset, again closing the normally closed contacts 132 and opening the normally open contacts 134.

FIG. 3 is a schematic diagram which illustrates a novel use of an interposing relay, referred to as heat initiation relay HIR, which arrangement does not require timer HIT to carry the energization current for heat solenoid valve HS. The current requirements for pilot solenoid PS are low, and easily carried by the contacts of an economical timer. As shown in FIG. 3, heat initiation relay HIR is connected to be immediately energized by the heat signal HSIG, with relay HIR and pilot solenoid PS being serially connected between controller 18 and electrical ground. Timer HIT has its normally open contacts 134 connected across, ie., in electrical parallel with relay HIR. If system 10 is initially started with pilot solenoid PS energized to reduce the starting load on prime mover 34, such as via a start up signal SUS, then a blocking diode 136 is inserted into the circuit of relay HIR to prevent current flow back into controller 18.

Relay HIR has a set of normally open contacts 138 connected such that when relay HIR is energized by heat signal HSIG, heat signal HSIG will also energize heat solenoid HS. The relative impedances of relay HIR and pilot solenoid PS are selected such that pilot solenoid PS will provide an energizing path to ground for relay HIR which immediately energizes relay HIR when heat signal HSIG is provided by controller 18, but the voltage drop across relay HIR will provide insufficient voltage to actuate pilot solenoid PS from the cooling to the heating position thereof. For example, the impedance of relay HIR may be at least about five times the impedance of pilot solenoid PS. When heat signal HSIG is provided by controller 18, relay HIR is energized, closing its contacts 138, and heat solenoid is energized, opening the auxiliary liquid line 128 to initiate the desired flushing of condenser 50. When timer HIT times out and closes the normally open contacts 134, the full voltage of heat signal HSIG is applied to pilot solenoid PS, actuating it to the heat position, and the closed contacts 134 now short relay HIR, causing relay HIR to drop out and open its contacts 138. Thus, heat solenoid HS is de-energized, closing the auxiliary liquid line 128.

Either or both of the evaporator sections 66 and 68 may operate in a cooling cycle while three-way valve 38 is in the cooling position, by opening the associated liquid line solenoid valve LLS1 or LLS2. While one of the evaporator sections is in a cooling cycle, the other evaporator section may enter a null cycle when it neither requires heating or cooling, by simply closing its associated liquid line solenoid valve. Both evaporator sections 66 and 68 cannot go into a null condition at the same time, unless prime mover 34 is arranged to shut off when neither evaporator section requires cooling or heating.

One of the evaporator sections 66 or 68 may be in a heating cycle while the other is in a null cycle, by opening its associated hot gas solenoid valve HGS1 or HGS2, with three-way valve 38 being in the heating position. Since the heating capacity will usually be insufficient to properly heat both evaporator sections 66 and 68 at the same time, controller 18 will normally be interlocked to allow only one evaporator section to be in a heating cycle at any one time.

When one of the evaporator sections requires heat, the other evaporator section may be in a cooling cycle, notwithstanding that the mode selecting three-way valve 38 has been operated to the heating position. The evaporator coil operating in a heating mode or cycle functions as a condenser for the evaporator coil which is operating in a cooling mode or cycle. For example, if evaporator section 66 requires a heating cycle while evaporator section 68 requires a cooling cycle, hot gas solenoid HGS1 and liquid line solenoid valve LLS2 will be opened, and suction line solenoid SLS1 will be closed. Thus, hot gas in suction line section 78 will be forced to flow to the expansion valve 90 of evaporator section 68 via check valve 108 and the open liquid line solenoid LLS2. If the prior art teachings of keeping heat solenoid HS open during a heating cycle were to be followed, the high pressure gas would be short circuited to the low pressure side of the system, from tee 112, to tee 126, and through the open heat solenoid HS to the accumulator 80. Thus, it is essential that heat solenoid HS be closed after it performs a condenser flushing function at the start of a heating cycle, at least when one of the evaporator sections is, or will be, operating in a cooling cycle while another of the evaporator sections is operating in a heating cycle.

In summary, there has been disclosed new and improved apparatus and methods for extending the benefits of U.S. Pat. No. 4,912,933 to compartmentalized transport refrigeration systems, where hot gas heating capacity is often most critical. The additional heating capacity provided by the invention will in most cases eliminate the need for electrical heating in a compartmentalized transport refrigeration system, which thus eliminates the cost of an induction generator and the associated electrical contactors and resistors.

We claim:

1. In a compartmentalized transport refrigeration system which holds selected set point temperatures in at least first and second served spaces via heating and cooling cycles, a refrigerant circuit having high and low pressure sides, including a compressor, a condenser, a receiver, at least first and second evaporator sections respectively associated with the first and second served spaces, an accumulator, and mode selector valve means having heating and cooling positions, and control means for providing a heat signal when the need for a heating cycle in one of the served spaces is detected, with the mode selector valve means being in the cooling position thereof in the absence of a heat signal, the improvement comprising:

first means responsive to the heat signal for connecting the receiver and low pressure side of the refrigeration system in direct fluid flow communication, with said first means including a controllable valve which is operated from a closed position to an open position in response to the heat signal, and second means responsive to the heat signal for operating said mode selector valve means from the cooling position to the heating position thereof, a predetermined period of time after initiation of the heat signal, said first means including means responsive to the termination of said predetermined period of time for returning the controllable valve of said first means to the closed position thereof, whereby a condenser flushing mode occurs prior to a heating cycle relative to a served space, which forces liquid refrigerant in the condenser to flow to the low pressure side of the refrigeration circuit via the receiver, to increase the quantity of refrigerant available during the heating cycle, while preventing high pressure refrigerant required by a cooling cycle associated with another of the served spaces from being short circuited to the low pressure side of the refrigeration circuit.

2. The compartmentalized transport refrigeration system of claim 1 wherein the first means connects the receiver directly to the accumulator.

3. The compartmentalized transport refrigeration system of claim 1 including a main liquid line connected to the receiver, with the main liquid line having a refrigerant drier and a check valve therein, and the first means further includes an auxiliary liquid line which taps the main liquid line at a point downstream from the refrigerant drier and check valve, and extends to the accumulator, with the controllable valve of the first means being disposed in the auxiliary liquid line.

4. The compartmentalized transport refrigeration system of claim 1 wherein the mode selector valve means includes an electrical coil, and the first means includes electrical control, said electrical control comprising an interposing relay having an electrical coil connected to be energized by the heat signal via the electrical coil of the mode selector valve means, with the relative impedances of the interposing relay and the electrical coil of the mode selector valve means being such that the interposing relay is actuated by the heat signal while the electrical coil of the mode selector valve means provides a ground path for the interposing relay without actuation of the mode selector valve means from the cooling to the heating position, said interposing relay having a normally open electrical contact connected to energize the controllable valve of the first means while the interposing relay is energized, and wherein the second means includes a normally open electrical contact connected in parallel with the interposing relay, with the normally open electrical contact of the second means being closed at the end of the predetermined period of time to cause the heat signal to directly energize the mode selector valve means and cause it to switch from the cooling position to the heating position, while shorting the interposing relay, causing it to open its normally open contact to terminate energization of the controllable valve of the first means.

5. The compartmentalized transport refrigeration system of claim 1 including a timer connected to be energized by the heat signal, with said timer having normally closed and normally open first and second electrical contacts which respectively open and close a predetermined period of time after energization, with the first and second means respectively including the first and second electrical contacts.

6. A method of operating a compartmentalized transport refrigeration system which holds selected set point temperatures in at least first and second served spaces via heating and cooling cycles, a refrigerant circuit having high and low pressure sides, including a compressor, a condenser, a receiver, at least first and second evaporator sections respectively associated with the first and second served spaces, an accumulator, and mode selector valve means having heating and cooling positions, comprising the steps of:

providing a heat signal when the need for a heat cycle is detected in one of the served spaces, connecting the receiver in direct fluid flow communication with the low pressure side of the refrigerant circuit when the heat signal is provided, initiating a predetermined timing period in response to the heat signal, maintaining the mode selector valve means in a cooling cycle position during the timing period, operating the mode selector valve means to select the heating cycle at the expiration of the timing period, and terminating the direct fluid communication between the receiver and low pressure side of the refrigerant circuit at the expiration of the timing period, whereby continuing the mode selector valve means in the cooling position thereof while the receiver is directly connected to the low pressure side of the refrigerant circuit forces liquid refrigerant trapped in the condenser to become available for a heating cycle, while preventing high pressure refrigerant required by a cooling cycle associated with another of the served spaces, from being short circuited to the low pressure side of the refrigerant circuit.

7. The method of claim 6 wherein the step of connecting the receiver in direct fluid flow communication with the low side of the refrigerant circuit when the heat signal is provided, connects the receiver directly to the accumulator.

* * * * *